US00RE35640E

United States Patent [19]

Hotta et al.

[11] E Patent Number: Re. 35,640

[45] Reissued Date of Patent: Oct. 21, 1997

[54] REVERSIBLE THERMOSENSITIVE RECORDING MATERIAL

[75] Inventors: Yoshihiko Hotta, Numazu; Keishi Kubo, Yokohama; Makoto Kawaguchi, Shizuoka-ken; Toru Nogiwa, Numazu, all of Japan

[73] Assignee: Ricoh Company, Ltd., Tokyo, Japan

[21] Appl. No.: 195,479

[22] Filed: Feb. 14, 1994

Related U.S. Patent Documents

Reissue of:

[64] Patent No.: 5,087,601
Issued: Feb. 11, 1992
Appl. No.: 417,063
Filed: Oct. 4, 1989

[30] Foreign Application Priority Data

| | | | |
|---|---|---|---|
| Oct. 6, 1988 | [JP] | Japan | 63-252767 |
| Dec. 6, 1988 | [JP] | Japan | 63-306855 |
| Jan. 12, 1989 | [JP] | Japan | 1-005510 |
| Mar. 14, 1989 | [JP] | Japan | 1-061586 |
| Jun. 19, 1989 | [JP] | Japan | 1-156173 |

[51] Int. Cl.[6] ..... B41M 5/28

[52] U.S. Cl. ..... 503/200; 503/208; 503/214; 503/217; 503/226

[58] Field of Search ..... 503/200, 208, 503/214, 217, 226

[56] References Cited

U.S. PATENT DOCUMENTS

| | | | |
|---|---|---|---|
| 4,917,948 | 4/1990 | Hotta | 428/335 |
| 5,017,421 | 5/1991 | Hotta et al. | 428/210 |
| 5,085,934 | 2/1992 | Hotta et al. | 428/335 |
| 5,158,924 | 10/1992 | Konagaya et al. . | |
| 5,158,926 | 10/1992 | Hotta et al. . | |
| 5,219,820 | 6/1993 | Morohoshi et al. . | |
| 5,260,254 | 11/1993 | Hotta et al. | 503/217 |
| 5,283,220 | 2/1994 | Kawaguchi et al. . | |
| 5,298,476 | 3/1994 | Hotta et al. . | |

FOREIGN PATENT DOCUMENTS 1-014079 1/1989 Japan .

OTHER PUBLICATIONS

McGraw–Hill Dictionary of Scientific and Technical Terms, Third Edition (1984), p. 1398.

*Kirk–Othmer* Encyclopedia of Chemical Technology, Third Edition (1981), vol. 15, pp. 32–61.

JIS Z8741, partial translation, Nov. 1, 1983.

JIS Z0601, partial translation, Jun. 15, 1982. Jun. 1983.

*Primary Examiner*—Pamela R. Schwartz

*Attorney, Agent, or Firm*—Oblon, Spivak, McClelland, Maier & Neustadt, P.C.

[57] ABSTRACT

A reversible thermosensitive recording material is disclosed, which comprises (i) a reversible thermosensitive recording layer which comprises as the main components a matrix resin and an organic low-molecular-weight material dispersed in the matrix resin, and (ii) a light reflection layer made of a metal thin film, which is preferably surface-treated to have a specular gloss of 70 to 250% in accordance with JIS Z8741 or a surface roughness of 0.5 to 10 μm in terms of the ten-point average roughness defined in JIS B0601. This reversible thermosensitive recording material may further comprises a crystal-growth controlling agent in the reversible thermosensitive recording layer.

49 Claims, 5 Drawing Sheets

REVERSIBLE THERMOSENSITIVE RECORDING MATERIAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a reversible thermosensitive recording material capable of recording and erasing images repeatedly by utilizing its property that the transparency can be changed reversibly from a transparent state to an opaque state, and vice versa, depending upon the temperature thereof.

2. Discussion of Background

There are conventionally proposed reversible thermosensitive recording materials capable of performing reversible recording and deleting images, which comprise a support and a reversible thermosensitive layer in which an organic low-molecular-weight material, such as a higher alcohol or a higher fatty acid, is dispersed in a matrix resin such as polyester and vinyl chloride, as disclosed, for example, in Japanese Laid-Open Patent Applications 54-119377 and 55-154198. In the above-mentioned reversible thermosensitive recording materials, the formation of images and the erasure thereof in the thermosensitive recording layer thereof can be carried out by utilizing the property of the reversible thermosensitive recording materials that the transparency of the recording layer of the materials changes depending upon the temperature thereof.

Such conventional reversible thermosensitive recording materials, however, have the shortcoming that an opaque state of the reversible thermosensitive recording layer is changed to a transparent state within a range of as narrow as 2° C. to 4° C. Therefore it is difficult to control the temperature at which a partially opaque reversible thermosensitive recording material is totally changed to a transparent state, or a totally opaque reversible thermosensitive recording material is changed to a partially transparent state to form transparent images thereon. Furthermore, the conventional reversible thermosensitive recording materials are not durable in the repeated operation of forming and erasing the images.

Furthermore, the conventional reversible thermosensitive recording materials have the shortcoming that the contrast of an image area to a background is affected by the amount of the organic low-molecular-weight material contained in the matrix resin. More specifically, when the amount ratio of the organic low-molecular-weight material to the matrix resin is low, the density of a milky white opaque area is low. Reversely, when the amount ratio of the organic low-molecular-weight material to the matrix resin is high, the transparency is insufficient although the density of the milky white opaque area is sufficiently high.

The contrast of the image area to the background is also degraded when a black support which is colored in black is employed.

The applicants of the present invention have found that the contrast of the image area to the background in the reversible thermosensitive recording layer can be upgraded by attaching a light reflection layer to the reversible thermosensitive recording layer, as shown in Japanese Laid-Open Patent Application 1-14079. However, when a light reflection layer made of a metal is directly attached to the thermosensitive recording layer, the adhesion of the light reflection layer to the thermosensitive recording layer is so poor that the light reflection layer is easily peeled off the thermosensitive recording layer. Accordingly, the durability of the reversible thermosensitive recording material is shortened. Furthermore, the reflectance becomes too high to be used in practice when a metal such as aluminum is deposited on an even surface of the support, so that reflected images become unclear.

SUMMARY OF THE INVENTION

It is therefore a first object of the present invention to provide a reversible thermosensitive recording material with improved durability, capable of yielding clear images with high contrast, which images are clearly observed from every angle, with minimized excessive regular reflectance of the light.

The above object of the present invention can be attained by a reversible thermosensitive recording material which comprises (i) a reversible thermosensitive recording layer comprising a matrix resin and an organic low-molecular-weight material dispersed in the matrix resin, and (ii) a light reflection layer made of a metallic thin film. It is preferable that the light reflection layer have a specular gloss of 70 to 250% in accordance with the JIS Z8741 or a surface roughness of 0.5 to 10 μm in accordance with the JIS B0601.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The reversible thermosensitive recording material according to the present invention comprises (i) a reversible thermosensitive recording layer, comprising a matrix resin and an organic low-molecular-weight material dispersed in the matrix resin and (ii) a light refection layer made of a metal thin film. The reversible thermosensitive recording layer is switched from a milky white opaque state to a transparent state, or vice versa, depending on the temperature thereof.

In the transparent state and the milky white opaque state of the reversible thermosensitive recording layer, the size of the crystals of the organic low-molecular-weight material, which is dispersed in the form of particles in a matrix resin, is considered to be different. In the transparent state, the organic low-molecular-weight material consists of relatively large crystals, possibly most of them being single crystals, so that the light which enters the crystals from one side passes therethrough to the opposite side, without being scattered, thus the reversible thermosensitive recording material appears transparent. In contrast to this, when the thermosensitive recording material is in the milky white opaque state, the organic low-molecular-weight material is composed of polycrystals consisting of numerous small crystals, with the crystallographic axes pointed to various directions, so that the light which enters the recording layer is scattered a number of times on the interface of crystals of the low-molecular-weight material. As a result, the thermosensitive recording layer becomes opaque in a milky white color.

The transition of the state of the reversible thermosensitive recording layer depending on the temperature thereof will now be explained by referring to FIG. 1.

Figure 1:
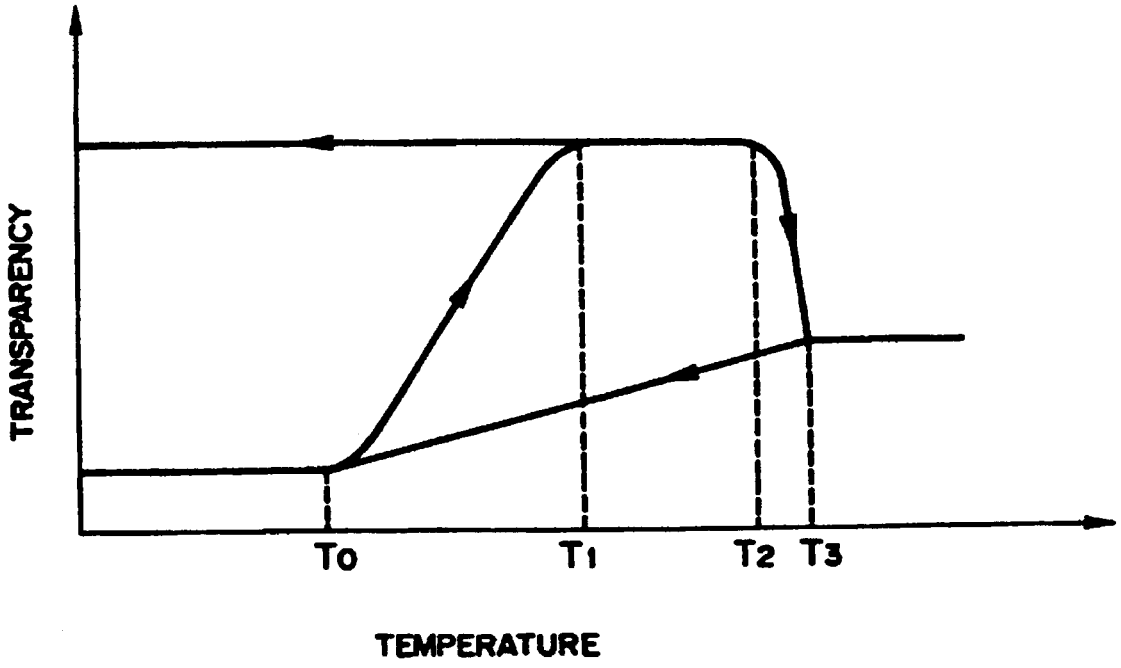
FIG. 1 is a graph in explanation of the principle of the formation and erasion of images in a reversible thermosensitive recording material according to the present invention.

In FIG. 1, it is supposed that the thermosensitive recording layer is initially in a milky white opaque state at room temperature $T_0$ or below. When the recording material is heated to temperature $T_1$, the recording layer becomes transparent. This transparent state is maintained even if the temperature is further elevated to temperature $T_2$. Thus, the recording material reaches a maximum transparent state at temperature $T_1$. Even if the recording material which is already in the maximum transparent state is cooled to room temperature $T_0$ or below, the maximum transparent state is maintained. It is considered that this is because the organic low-molecular-weight material changes its state from a polycrystalline state to a single crystalline state via a semi-melted state during the above-mentioned heating and cooling steps.

When the recording material in the maximum transparent state is further heated to temperature $T_3$, it reaches a medium state which is between the maximum transparent state and the milky white opaque state. When the recording material in the medium state at temperature $T_3$ is cooled to room temperature $T_0$ or below, the recording material returns to the original maximum opaque state, without passing through any transparent state. It is considered that this is because the organic low-molecular-weight material is melted when heated to temperature $T_3$ or above, and the polycrystals of the organic low-molecular-weight material grow and separate out when cooled to temperature $T_0$ or below. If the recording material in the milky white opaque state is heated to any temperature between temperature $T_0$ and temperature $T_1$, and then cooled to a temperature below $T_0$, the recording material reaches an intermediate state between the transparent state and the milky white opaque state.

When the recording material in the transparent state at room temperature $T_0$ is again heated to temperature $T_3$ or above, and then cooled to room temperature $T_0$, the recording material returns to the maximum milky opaque state. Thus, the reversible thermosensitive recording material according to the present invention can be in a milky white maximum opaque state, a maximum transparent state and an intermediate state between the aforementioned two states at room temperature.

Therefore, a milky white opaque image can be obtained on a transparent background, or a transparent image can also be obtained on a milky white opaque background by selectively applying the thermal energy to the reversible thermosensitive recording material according to the present invention. Further, such image formation can be repeated over a long period of time.

The reversible thermosensitive recording material according to the present invention can be obtained by forming a reversible thermosensitive recording layer on a support in the manner described below. Alternatively, a self-supporting type thermosensitive recording sheet without any support, which is obtained by a conventional film-forming method, can be employed.

To form the reversible thermosensitive recording layer on the support, a solution in which the matrix resin, the organic low-molecular-weight material, and when necessary, an agent to control the crystal growth of the above organic low-molecular-weight material, are dissolved, or a matrix resin solution of the organic low-molecular-weight material which is dispersed in the form of finely-divided particles therein is coated on the support such as a plastic film, glass plate or metallic plate, and then dried, so that the reversible thermosensitive recording layer can be formed on the support.

The solvent used for the formation of the thermosensitive recording layer can be selected depending on the type of the organic low-molecular-weight material and the kind of the matrix resin to be employed. For example, organic solvents such as tetrahydrofuran, methyl ethyl ketone, methyl isobutyl ketone, chloroform, carbon tetrachloride, ethanol, toluene and benzene can be employed. As a matter of course, when the above-mentioned matrix resin solution is employed, a solvent which does not dissolve the organic low-molecular-weight material must be used.

In the thus formed reversible thermosensitive recording layer, the organic low-molecular-weight material is dispersed in the matrix resin in the form of finely-divided particles. It is preferable to employ such matrix resins that can uniformly hold the particles of the organic low-molecular-weight material therein, and impart high transparency to the recording layer when the recording layer is in a maximum transparent state, and are mechanically stable and have excellent film-forming properties.

Specific examples of the matrix resin for use in the reversible thermosensitive recording layer are vinyl chloride copolymers such as polyvinyl chloride, vinyl chloride - vinyl acetate copolymer, vinyl chloride - vinyl acetate - vinyl alcohol copolymer, vinyl chloride - vinyl acetate - maleic acid copolymer and vinyl chloride -acrylate copolymer; vinylidene chloride copolymers such as polyvinylidene chloride, vinylidene chloride - vinyl chloride copolymer and vinylidene chloride - acrylonitrile copolymer;, polyester, polyamide; polyacrylate, polymethacrylate and acrylate - methacrylate copolymer; and silicone resin. These resins may be used alone or in combination.

The organic low-molecular-weight material for use in the present invention may be appropriately selected in accordance with each of the desired temperature ranges, $T_0$ to $T_1$, $T_1$ to $T_2$ and $T_2$ to $T_3$. It is preferable that organic low-molecular-weight materials have a melting point ranging from 30° to 200° C., more preferably from about 50° to 150° C.

Examples of the organic low-molecular-weight materials are alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cycloalkynes; saturated or unsaturated monocarboxylic acids, or saturated or unsaturated dicarboxylic acids, and esters, amides and ammonium salts thereof; saturated or unsaturated halogenated fatty acids, and esters, amides and ammonium salts thereof; arylcarboxylic acids, and esters, amides and ammonium salts thereof; halogenated arylcarboxylic acids, and esters, amides and ammonium salts thereof; thioalcohols; thiocarboxylic acids, and esters, amides and ammonium salts thereof; and carboxylic acid esters of thioalcohol. These materials can be used alone or in combination. It is preferable that the number of carbon atoms of the above-mentioned low-molecular-weight material be in the range of 10 to 60, more preferably in the range of 10 to 38, further preferably in the range of 10 to 30. Part of the alcohol groups in the esters may be saturated or unsaturated, and further may be substituted by halogen. In any case, it is preferable that the organic low-molecular-weight material have at least one atom selected from the group consisting of oxygen, nitrogen, sulfur and halogen in its molecule. More specifically, it is preferable that the organic low-molecular-weight materials comprise, for instance, —OH, —COOH, —$CONH_2$, —COOR (wherein R is $NH_4$ or an alkyl group having 1 to 20 carbon atoms), —NH, —$NH_2$, —S, —S—S, —O and a halogen atom.

Specific examples of the above-mentioned organic low-molecular-weight materials include higher fatty acids such as lauric acid, dodecanoic acid, myristic acid, pentadecanoic acid, palmitic acid, stearic acid, behenic acid, nonadecanoic acid, arachic acid and oleic acid; esters of higher fatty acids such as methyl stearate, tetradecyl stearate, octadecyl stearate, octadecyl laurate, tetradecyl palmitate and docosyl behenate; and the following ethers or thioethers:

$C_{16}H_{33}-O-C_{16}H_{33}$, $C_{16}H_{33}-S-C_{16}H_{33}$, $C_{18}H_{37}-S-C_{18}H_{37}$, $C_{12}H_{25}-S-C_{12}H_{25}$, $C_{19}H_{39}-S-C_{19}H_{39}$, $C_{12}H_{25}-S-S-C_{12}H_{25}$,

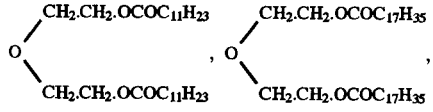

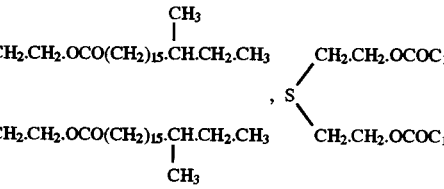

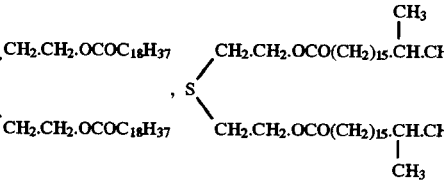

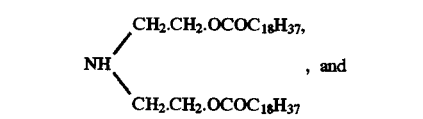

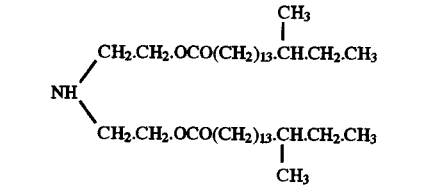

It is preferable that the ratio by weight of the organic low-molecular-weight material to the matrix resin be in the range of about (1:0.5) to (1:16), and more preferably in the range of (1:1) to (1:3). When the organic low-molecular-weight material is contained in the matrix resin within the above range, not only the matrix resin can form a film in which the organic low-molecular-weight material is uniformly dispersed in the form of finely-divided particles, but also the obtained reversible thermosensitive recording layer can readily reach the maximum milky white opaque state.

It is preferable that the thickness of the reversible thermosensitive recording layer be in the range of 1 to 30 μm, more preferably in the range of 10 to 30 μm. To increase the whiteness degree in the milky white opaque state of the recording layer, the amount of the above-mentioned fatty acids dispersed in the matrix resin may be added.

In the present invention, some agents which can control the crystal growth of the above-mentioned organic low-molecular-weight material may be used together. Such crystal-growth controlling agents that can melt together with the organic low-molecular-weight material and increase the temperature range where the organic low-molecular-weight material is in the semi-melt state, and further promote the activity of crystals of the organic low-molecular-weight material are preferably employed. For example, surface-active agents can be employed as the crystal-growth controlling agent to maintain the temperature range where the reversible thermosensitive recording material is in the maximum transparent state in the repeated practical use.

Examples of the above-mentioned surface-active agents for use in the present invention are polyhydric alcohol higher fatty acid esters; polyhydric alcohol higher alkyl ethers; sub-olefin oxide addition products of polyhydric alcohol higher fatty acid ester, higher alcohol, higher alkylphenol, higher alkylamine of higher fatty acid, amides of higher fatty acid, fat and oil of higher fatty acid and polypropylene glycol; acetylene glycol; sodium, calcium, barium and magnesium salts of higher alkyl benzenesulfonic acid; sodium, calcium, barium and magnesium salts of higher fatty acid, aromatic carboxylic acid, higher aliphatic sulfonic acid, aromatic sulfonic acid, sulfuric monoester, phosphoric monoester and phosphoric diester; lower sulfated oil; long-chain polyalkyl acrylate; acrylic oligomer; long-chain polyalkyl methacrylate; long-chain alkyl methacrylate - amine-containing monomer copolymer; styrene -maleic anhydride copolymer; and olefin - maleic anhydride copolymer.

In addition, to widen the temperature range where the maximum transparent state of the reversible thermosensitive recording material is maintained, plasticizers for a film, such as tributyl phosphate, tri-2-ethylhexyl phosphate, triphenyl phosphate, tricresyl phosphate, butyl oleate, dimethyl phthalate, diethy phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol, di-2-ethylbutyrate, methyl acetylricinoleate, butyl acetylricinoleate, butylphthalyl butyl glycolate and tributyl acetylcitrate can be employed.

It is possible to use one of the above-listed organic low-molecular-weight materials together with the other organic low-molecular-weight material which serves as a crystal-growth controlling agent. For example, stearic acid and stearyl alcohol can be used in combination. In this case, the former functions as the organic low-molecular-weight material and the latter as the crystal-growth controlling agent.

It is preferable that the mixing ratio by weight of the organic low-molecular-weight material to the crystal-growth controlling agent thereof be in the range of about (1:0.01) to (1:0.8). When the amount ratio of the crystal-growth controlling agent is within the above range, the temperature range and energy range where the recording layer is in the transparent state can be widened as well as the whiteness degree in the milky white opaque state of the recording layer can be sufficiently increased.

Figure 2A:
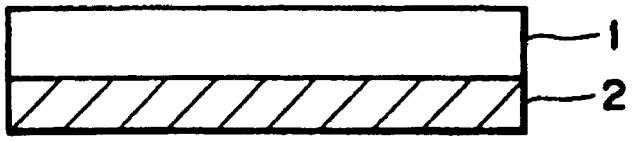
FIGS. 2(a) to 2(i) are the cross-sectional views of examples of a reversible thermosensitive recording material according to the present invention.

According to the present invention, the reversible thermosensitive recording material can be constructed in a variety of fashions. For example, a reversible thermosensitive recording layer 1 is attached to a light reflection layer 2 as shown in FIG. 2(a).

Figure 2B:
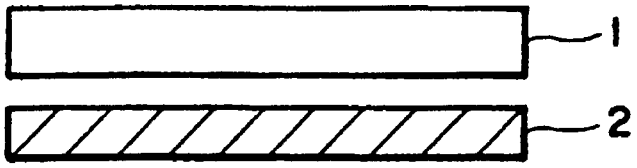

A recording layer 1 and a light reflection layer 2 are prepared separately as shown in FIG. 2(b).

Figure 2C:
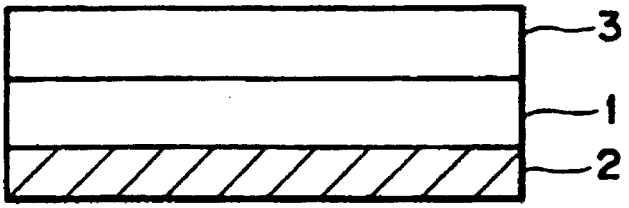

Furthermore, a reversible thermosensitive recording layer 1 and a light reflection layer 2 are successively overlaid on a support 3 as shown in FIG. 2(c).

Figure 2D:
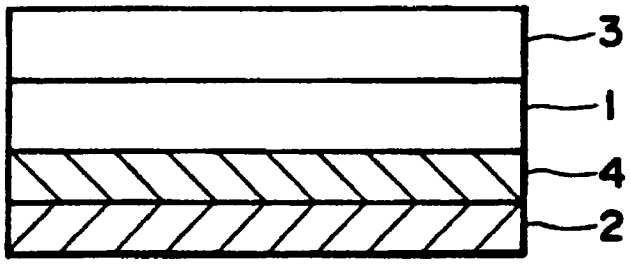

A reversible thermosensitive recording layer 1, a light absorbing layer 4 and a light reflection layer 2 are successively overlaid on a support 3 as shown in FIG. 2(d).

Figure 2E:
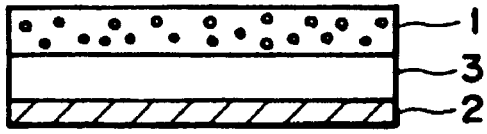

As shown in FIG. 2(e), a support 3 which is a transparent film is interposed between a reversible thermosensitive recording layer 1 and a light reflection layer 2.

Figure 2F:
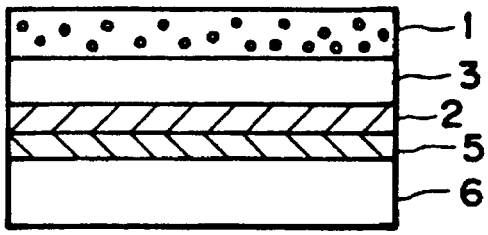

In FIG. 2(f), a light reflection layer 2 formed on a light-reflection-layer-support member 6 via an adhesive layer 5 is attached to one side of a support 3. On the other side of the support 3, a reversible thermosensitive recording layer 1 is formed.

Figure 2G:
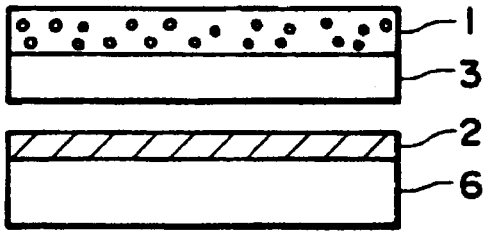

In FIG. 2(g), a reversible thermosensitive recording layer 1 is attached to a support 3. A light reflection layer 2, separately attached to a light-reflection-layer-support member 6, is simply placed on the support 3.

Figure 2H:
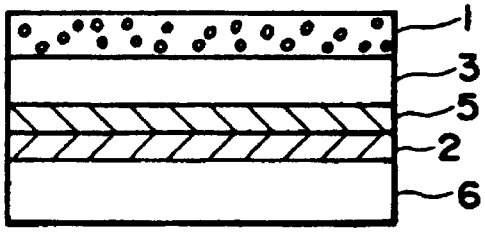

In FIG. 2(h), the same support 3 and light reflection layer 2 as employed in FIG. 2(g) are attached together by means of an adhesive layer 5.

Figure 2I:
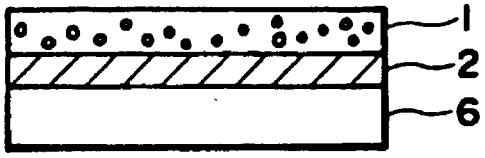

In FIG. 2(i), a reversible thermosensitive recording layer 1 is attached to a light reflection layer 2 which is formed on a light-reflection-layer-support member 6.

Figure 4A:
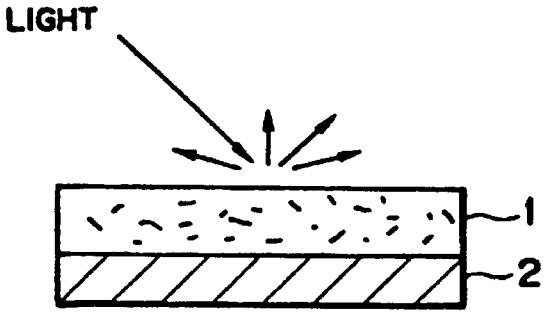
FIGS. 4(a) and 4(b) are diagrams which illustrate how the reversible thermosensitive recording materials according to the present invention reflect the light.
Figure 4B:
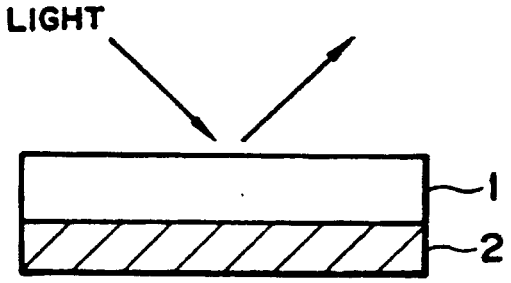

When the reversible thermosensitive recording material according to the present invention with a structure as shown in FIG. 2(a) is employed, if the reversible thermosensitive recording layer 1 is in the milky white opaque state, the light which enters the recording layer 1 is scattered, as shown in FIG. 4(a). To the contrary, when the recording layer 1 is in the transparent state, the incident light is regularly reflected as shown in FIG. 4(b), because the light reflection layer 2 is provided under the recording layer.

Figure 5A:
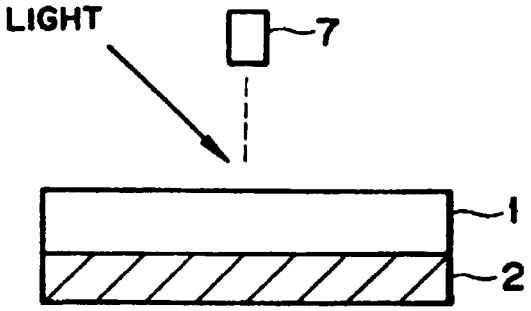
FIGS. 5(a) and 5(b) are diagrams which illustrate how the light reflected by the reversible thermosensitive recording materials according to the present invention is read by a photosensor.
Figure 5B:
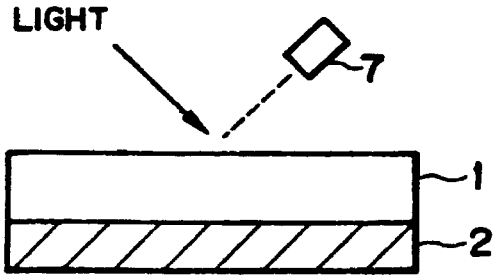

To read the reflected light, a photosensor 7 is located in two positions as shown in FIGS. 5(a) and 5(b).

In FIG. 5(a), the photosensor 7 is located at any positions except a position where the light is regularly reflected. In this case, when the thermosensitive recording layer 1 is in the transparent state, the photosensor 7 does not sense the light, and reversely, when the recording layer 1 is in the milky white opaque state, the photosensor 7 senses a part of the scattered lights. In the case where the photosensor 7 is located at this position, the amount of the light sensed by the photosensor 7 is increased and the image contrast is upgraded when the recording layer is in the milky white opaque state.

On the other hand, when the photosensor 7 is located at the position where the light is regularly reflected as shown in FIG. 5(b), the photosensor 7 senses the light when the recording layer 1 is in the transparent state. In contrast to this, when the recording layer 1 is in the milky white opaque state, the amount of light sensed by the photosensor 7 is decreased. In the case where the photosensor 7 is located at this position, the image contrast is upgraded when the recording layer is in the transparent state.

The light reflection layer for use in the present invention may be made of any metals which reflect light. For example, when the reflected image is seen by the eyes, the light reflection layer is required to reflect the visible light. When the light is emitted from a light source and the reflected image is read by an image reading apparatus, the material for the light reflection layer is required to reflect the light in accordance with the light source and the image reading apparatus. If the semiconductor laser beam is used, it is essential for the light reflection layer to reflect near infrared rays.

The degree of whiteness of the milky white opaque area in the recording layer is increased and the image contrast can be improved by the aid of the light reflection layer. However, when the surface of the light reflection layer is just like a mirror surface, the incident light is regularly reflected, so that obtained images my not be clearly seen, depending upon the viewing angle. Furthermore, when the reversible thermosensitive recording material according to the present invention is in the transparent state, it is capable of producing milky white opaque images thereon by selectively heating the surface of the recording material. However, if the employed support is colored in black, the degree of whiteness of the milky white opaque images on the transparent recording layer is undesirably degraded, which causes the deterioration of the image contrast. In the present invention, therefore, to prevent extreme regular reflection of the light and to further improve image contrast, it is preferable that the light reflection layer for use in the present invention meet the following conditions:

(1) The light reflection layer, which is made of a metal thin-film, has a specular gloss of 70 to 250% as defined in accordance with JIS Z8741, or (2) The light reflection layer has a surface roughness of 0.5 to 10 μm in accordance with JIS B0601.

First, the condition (1) as to the specular gloss will be explained in detail.

The conventional reversible thermosensitive recording material disclosed in Japanese Laid-Open Patent Application 64-14079 comprises the light reflection layer which has the mirror surface. The regular reflection of the light by this recording material is so extreme that the obtained images appear unclear when viewed from a certain angle. To solve this problem, the light reflection layer of the reversible thermosensitive recording material according to the present invention is subjected to surface-treatment to have a specular gloss ranging from 70% to 250%, more preferably from 150% to 250%, in accordance with JIS Z8741.

The specular gloss of the light reflection layer for use in the present invention is mainly determined by the intensity of the light specularly reflected, and measured in accordance with JIS Z8741. To obtain the specular gloss, the luminous flux of the specular reflection by a light reflection layer for use in the present invention and the luminous flux of the specular reflection by a standard surface to the incident light at an angle of 60° are measured and expressed by the following formula:

$$\text{Specular gloss (\%)} = \frac{\text{Luminous flux of specular reflection by a light reflection layer}}{\text{Luminous flux of specular reflection by a standard surface}} \times \text{Specular gloss of standard surface}$$

When the specular gloss of the light reflection layer is within the above-mentioned range, the regular reflection can be prevented to some degree. In addition, the degree of whiteness of the milky white opaque area can be upgraded to improve the image contrast.

To prepare the light reflection layer which has a desired specular gloss, the surface of a metal thin-film serving as a light reflection layer may be treated to be rough; a metal thin-film may be formed by any methods such as vacuum deposition, ion plating, sputtering, and CVD method on a base film or a sheet of paper which has been surface-treated to be rough; a base film may be laminated on a metal thin-film which surface has been made rough; or a support such as a base film or a sheet of paper may be coated with freely-divided metal particles, as far as the surface of the light reflection layer has a specular gloss ranging from 70 to 250% in accordance with JIS Z8741.

For example, the surface of the above-mentioned base film can be made rough in the following manner:

(i) To coat a resin solution on the surface of the base film and impart the appropriate surface roughness as adjusting the conditions in the course of drying the resin solution.

(ii) To coat on the surface of the base film a dispersion containing a resin and a white or colored pigment.

Examples of the metals for use in the light reflection layer, which can be selected from any metals reflecting the light, include Al, Ge, Au, Ag, Cu and Ti, and alloys thereof.

Second, the condition (2) as to the surface roughness will be explained in detail.

In the reversible thermosensitive recording material according to the present invention, the metal thin-film serving as a light reflection layer is designed to have a since roughness of 0.5 to 10 μm in terms of ten-point mean roughness (Rz) defined in JIS B0601. As a result, the regular reflection of the light, which prevents the recognition of images, can be decreased, and at the same time, the degree of whiteness of the milky white opaque area can be increased to upgrade the image contrast.

To prepare the above-mentioned metal thin-film, the metal thin-film itself may be surface-treated to have a desired surface roughness.

Alternatively, the metal thin-film having a minute surface roughness may be attached to a support which has been surface-treated to have a predetermined surface roughness.

Figure 3A:
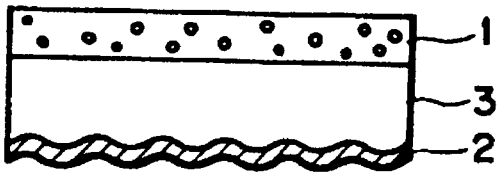
FIGS. 3(a) to 3(d) are the cross-sectional views of examples of a reversible thermosensitive recording material according to the present invention in which the light reflection layer is designed to have a predetermined surface roughness.

Specifically, as shown in FIG. 3(a), on the rough surface of a support 3, a light reflection layer 2 of a rough metal thin-film is formed, and on the other surface of the support 3, a reversible thermosensitive recording layer 1 is formed.

Figure 3B:
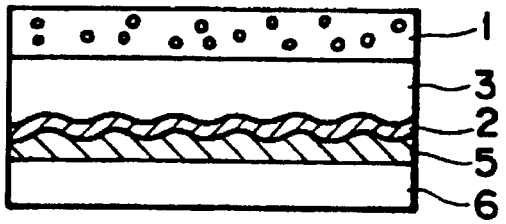

In FIG. 3(b), the same light reflection layer 2 as employed in FIG. 3(a) which is formed on a light-reflection-layer-support member 6, is attached to the same support as employed in FIG. 3(a).

Figure 3C:
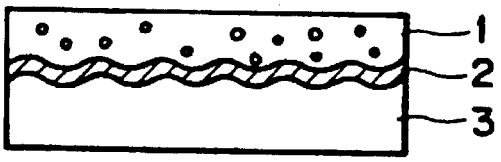

In FIG. 3(c), a light reflection layer 2 of a rough metal thin-film is formed on the rough surface of a support 3 and a reversible thermosensitive recording layer 1 is overlaid on the light reflection layer 2.

Figure 3D:
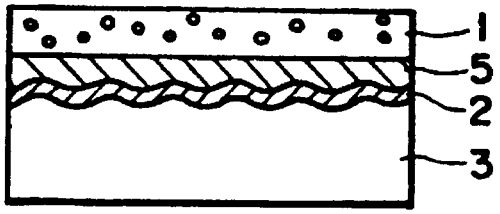

In FIG. 3(d), an adhesive layer 5 is interposed between the same light reflection layer 2 and reversible thermosensitive recording layer a as employed in FIG. 3(c).

To impart minute roughness to the surface of the support can be realized by the following surface-treatment methods, such as embossing, sandblasting, chemical dipping, pigment leading and pigment coating.

The embossing is one of the methods of imparting a desired roughness to the surface of a film. By passing the film between an embossing roller whose surface is rough and a pressure-application roller, the surface of the film is made rough.

By the sandblasting method, carborundum or finely-divided metal particles is vigorously blasted together with the pressed air to the surface of a film to impart a desired roughness thereto.

The chemical dipping method is to dip a film in a concentrated solution of an acid or alkali so as to make the surface of the film rough.

The pigment loading method imparts a desired roughness to a plastic film or plastic sheet in the course of the film-forming. The surface of the plastic film is made rough by adding a white or colored pigment to a thermoplastic resin when the film is manufactured.

Examples of the white pigments are silica, aluminum hydroxide, magnesium carbonate, magnesium oxide, titanium oxide, zinc oxide and barium sulfate. The finely-divided particles of the colored pigment having a particle diameter of about 0.5 to 5 μm may be used when necessary.

By the pigment coating method, the same pigment as employed in the pigment loading method is coated together with an adhesive resin on the surface of a film.

In the case where the pigment coating method is employed, iron oxide can be used as the pigment. A mixture of the iron oxide and a resin is coated on a film to impart a desired surface roughness, and further, it is possible to design this layer as a magnetic layer so as to be applicable to magnetic recording.

On the thus obtained support with a desired surface roughness, the metal thin-film is formed by any conventional methods such as vacuum deposition, ion plating, sputtering, and CVD method.

Examples of the metals for use in the light reflection layer, which can also be selected from any metals reflecting the light, include Al, Ge, Au, Ag, Cu and Ti, and alloys thereof.

In the present invention, the support may not be provided. In such a case, various types of the light reflection layer, for example, a metal thin-film which has been treated to have a predetermined surface roughness, a laminated material of a base film and a metal thin-film which surface is made rough, and a base film or a sheet of paper which is coated with finely-divided metal particles may be employed.

As the support for use in the present invention, conventional transparent or colored materials such as a plastic film, a sheet of paper, a glass plate and a metal plate can be used. It is preferable that the thickness of the support be in the range of about 10 to 300 μm. When the electrothermic method is employed for image recording, it is preferable to add an additive to the components of the support in order to control the resistance of the support.

In the reversible thermosensitive recording material according to the present invention, as previously mentioned, the adhesive layer may be interposed between the light reflection layer made of a metal thin-film and the reversible thermosensitive recording layer to improve the durability of the recording material. By means of the adhesive layer, the light reflection layer can be prevented from peeling off the thermosensitive recording layer even if the surface of the light reflection layer is smooth. In the case where the surface of the light reflection layer is surface-treated to have a desired surface roughness as shown in FIG. 3(d), the adhesion strength between the light reflection layer and the thermosensitive recording layer is further improved. The roughness of the light reflection layer can be absorbed by one surface of this adhesive layer and the opposite surface of the adhesive layer, which is brought into contact with the reversible thermosensitive recording layer, is smooth, so that there are no problems for forming the recording layer on the adhesive layer. In the present invention, when the light reflection layer is surface-treated to have the above-mentioned specular gloss ranging from 70 to 250% or surface roughness ranging from 0.5 to 10 μm, and furthermore, the adhesive layer is provided between the light reflection layer and the thermosensitive recording layer, the object of the present invention can be most efficiently attained.

The adhesive layer for use in the present invention is formed on the support which has at least one metallic surface, and then the reversible thermosensitive recording layer is overlaid on the adhesive layer.

As the resins for use in the adhesive layer, any resins which have good adhesion to metal and do not exert a bad influence upon the components of the thermosensitive recording layer can be employed. Examples of the resins are acrylic resins, polyester resins, vinyl chloride resins and polyamide resins.

Among the above-mentioned resins, saturated polyester resin, vinyl chloride - vinyl acetate - maleic acid, copolymer and vinyl chloride - vinyl acetate - vinyl alcohol copolymer are suitable, with the adhesion strength to the light reflection layer made of a metal thin-film and the reversible thermosensitive recording layer being taken into consideration. Furthermore, vinyl chloride copolymer, to be described below in detail, is more preferable.

The above-mentioned vinyl chloride copolymer consist of vinyl chloride, phosphoric ester containing a vinyl group, and other monomers capable of being polymerized with the above vinyl chloride, when necessary.

The above-mentioned phosphoric ester containing a vinyl group is represented by the following formula (1) or (2).

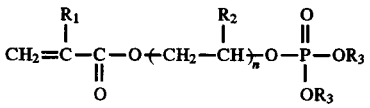

(1)

wherein $R^1$ represents —H or —$CH_3$; $R^2$ represents —H, —$CH_3$ or —$CH_2Cl$; $R^3$ represents —H, an alkyl group having 8 carbon atoms or less or a phenyl group having 8 carbon atoms or less; n is an integer of 1 to 10.

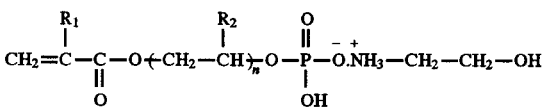

(2)

wherein $R^1$ represents —H or —$CH_3$; $R^2$ represents —H, —$CH_3$ or —$CH_2Cl$; n is an integer of 1 to 10.

Specific examples of the phosphoric ester containing a vinyl group are as follows:

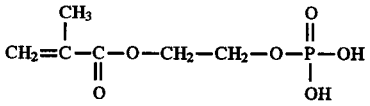

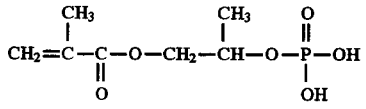

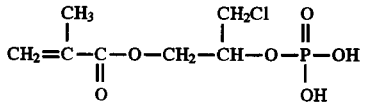

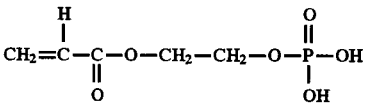

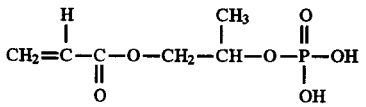

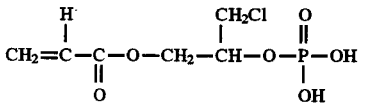

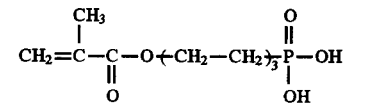

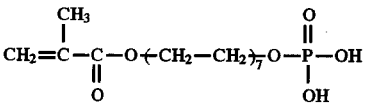

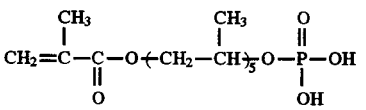

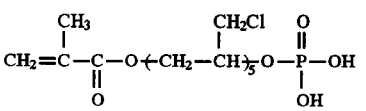

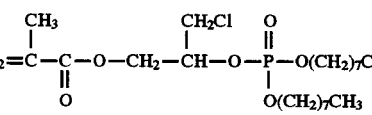

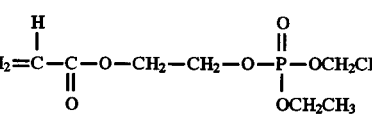

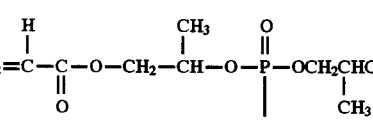

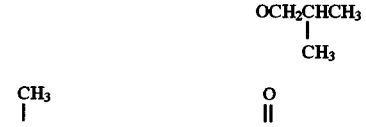

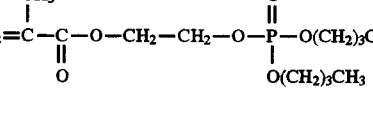

-continued

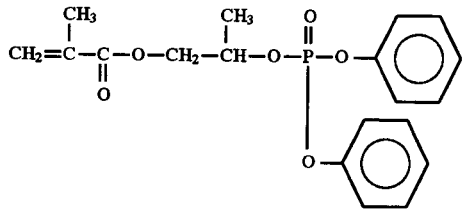

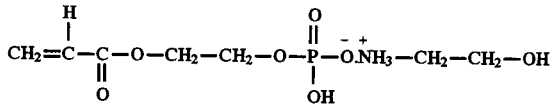

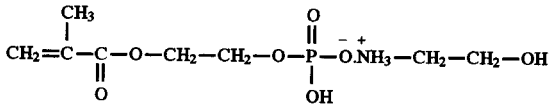

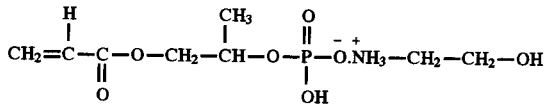

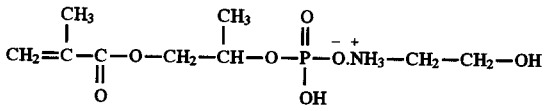

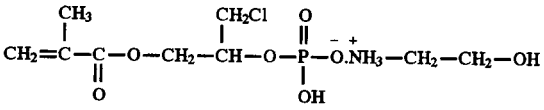

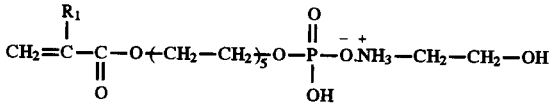

Examples of the monomers capable of being polymerized with vinyl chloride are carboxylic acid vinyl of vinyl acetate, vinylidene chloride, acrylonitrile, acrylic acid ester, methacrylic acid ester, vinyl ether, maleic acid and esters thereof, styrene, propylene and ethylene. In the present invention, the above monomers can be used alone or in combination.

It is preferable that the amount ratio of vinyl chloride, phosphoric ester containing a vinyl group, and the monomer capable of being polymerized with vinyl chloride in the vinyl chloride copolymer be (50 to 95 wt. %): (0.1 to 10 wt. %): (0.1 to 45 wt. %).

The manufacturing method of the copolymer of vinyl chloride and phosphoric ester containing a vinyl group will now be explained.

The polymerization of the vinyl chloride and phosphoric ester containing a vinyl group can be attained by the solution polymerization, suspension polymerization, bulk polymerization or emulsion polymerization. Among the above methods, the most practical methods are the solution polymerization method and the suspension polymerization method.

In the present invention, the manufacturing method of the above-mentioned copolymer by the solution polymerization will be explained.

A mixture of vinyl chloride, a monomer, such as vinyl acetate, which is polymerized with the above-mentioned vinyl chloride, and phosphoric ester containing a vinyl group is mixed in a solvent together with a polymerization initiator and the thus obtained mixture is heated. In such a case, when the phosphoric ester monomer is continuously added to the mixture in the course of polymerization, the copolymer with uniform composition can be obtained. The thus obtained copolymer is preferable from the viewpoints of dispersion properties of magnetic particles and physical film-forming properties. Furthermore, the obtained resin may be subjected to saponification reaction in the presence of alcohol, using hydrochloric acid as a catalyst.

In the adhesive layer for use in the present invention, conventional crosslinking agents such as isocyanate may be added to the above-mentioned resin to strengthen the adhesive force of the adhesive layer.

The solvent used in the coating liquid for the adhesive layer may be selected from the same solvents as employed in the preparation of the reversible thermosensitive recording layer.

Furthermore, in the reversible thermosensitive recording material, as previously mentioned, the light reflection layer may be formed on the light-reflection-layer-support member as shown in FIGS. 2(f), 2(h), 3(b), and 3(d). The above-mentioned adhesive layer may also be interposed between the light-reflection-layer-support member and the light reflection layer to increase the adhesion strength.

Other features of this invention will become apparent in the course of the following description of exemplary embodiments, which are given for illustration of the invention and are not intended to be limiting thereof.

EXAMPLE 1

A mixture of the following components was dispersed and the thus prepared coating solution was coated on a support made of a glass plate by a wire bar and dried at 65° C., so that a reversible thermosensitive recording layer having a thickness of 3 μm was formed, in the transparent state, on the support.

| | Parts by Weight |
|---|---|
| Behenic acid | 8 |
| Stearyl stearate | 2 |
| Vinyl chloride-vinyl acetate copolymer (Trademark "VYHH" made by Union Carbide Japan K.K.) | 25 |
| Tetrahydrofuran | 200 |

Chromium was vacuum-evaporated on the thus formed reversible thermosensitive recording layer, so that a light absorption layer having a thickness of 1000 Å was formed on the thermosensitive recording layer.

Aluminum was vacuum-evaporated on the thus formed light absorption layer, so that a light reflection layer having a thickness of 2000 Å was formed on the light absorption layer. Thus, a reversible thermosensitive recording material No. 1 according to the present invention was obtained.

Using a commercially available semiconductor laser beam oscillator, the above reversible thermosensitive recording material No. 1 was exposed to the laser beam with an output of 5 mW for 0.01 msec. As a result, the area of the thermosensitive recording layer, exposed to the semiconductor laser beam, was changed into the milky white opaque state. The semiconductor laser beam with an output of 1 mW was irradiated to the recording material to read the milky white opaque image and the reflected light was read. The reflectance of the transparent area was 82% and that of the milky white opaque area was 18%. Accordingly, the contrast attains to 4.6.

EXAMPLE 2

A mixture of the following components was dispersed and the thus prepared coating solution was coated on a polyester film having a thickness of 75 μm, serving as a support, by a wire bar and dried at 65° C., so that a reversible thermosensitive recording layer having a thickness of 3 μm was formed, in the transparent state, on the support.

| | Parts by Weight |
|---|---|
| Behenic add | 8 |
| Stearyl stearate | 2 |
| Vinyl chloride-vinyl acetate copolymer (Trademark "VYHH" made by Union Carbide Japan K.K.) | 25 |
| Tetrahydrofuran | 200 |

Using a thermal head, the thermal energy of 1 mJ was applied to the thus formed reversible thermosensitive recording layer. As a result, the area where the thermal energy was applied was changed into the milky white opaque state.

To the back side of the above prepared reversible thermosensitive recording layer, an aluminum-deposited PET film serving us a light reflection layer was attached, whereby a reversible thermosensitive recording material No. 2 was obtained. Then the density of the transparent area and milky white opaque area was measured by Macbeth densitometer RD-514. The density of the transparent area was 1.38 and that of the milky white opaque area was 0.18. Accordingly, the contrast attained to 7.7.

COMPARATIVE EXAMPLE 1

Example 1 was repeated except that the light reflection layer employed in Example 1 was not formed on the light absorption layer, whereby a comparative reversible thermosensitive recording material was obtained.

The milky white opaque area was formed on the transparent recording layer, in the same manner as employed in Example 1. The reflectance of the transparent area was 6% and that of the milky white opaque area was 9%. Accordingly, the contrast was 1.5.

COMPARATIVE EXAMPLE 2

Example 2 was repeated except that the aluminum-deposited PET film serving as the light reflection layer employed in Example 2 was replaced by a colored drawing paper, whereby a comparative reversible thermosensitive recording material No. 2 was obtained.

The milky white opaque area was formed on the transparent recording layer in the same manner as employed in Example 2.

The density of the transparent area and the milky white opaque area was respectively measured in the same manner as employed in Example 2. The density of the transparent area was 1.32 and that of the milky white opaque area was 0.54. Accordingly, the contrast was 2.4.

EXAMPLE 3

A polyester film serving as a support was surface-treated to be rough and aluminum was deposited on the rough surface of the polyester film, so that a light reflection layer having a specular gloss of 223% was prepared.

A mixture of the following components was dispersed and the thus obtained coating solution was coated on the back side (non aluminum-deposited side) of the above polyester film by a wire bar and dried under application of heat, so that a reversible thermosensitive recording layer having a thickness of 15 μm was formed. Thus, a reversible thermosensitive recording material No. 3 according to the present invention was obtained.

| | Parts by Weight |
|---|---|
| Behenic acid | 8 |
| Stearyl stearate | 2 |
| Di-2-ethylhexyl phthalate | 3 |
| Vinyl chloride-vinyl acetate copolymer | 20 |
| Tetrahydrofuran | 200 |

The thus obtained reversible thermosensitive recording material was heated to 65° C., so that the reversible thermosensitive recording layer was changed into the transparent state.

Using a thermal head, the thermal energy was applied to the recording layer for image formation. As a result, milky white opaque images were clearly obtained on the aluminum glossy surface.

EXAMPLE 4

Example 3 was repeated except that the specular gloss of the light reflection layer employed in Example 3, which film was surface-treated to be rough, was changed to 85.9%, whereby a reversible thermosensitive recording material No. 4 according to the present invention was obtained.

Using the thermal head, the image formation was performed in the same manner as employed in Example 3. As a result, milky white opaque images were clearly obtained on the aluminum glossy surface.

EXAMPLE 5

A mixture of the following components was dispersed and the thus obtained coating solution was coated on one side of a transparent polyester film by wire bar and dried under application of heat, so that a reversible thermosensitive recording layer having a thickness of 15 μm was formed on the polyester film.

| | Parts by Weight |
|---|---|
| Behenic acid | 8 |
| Stearyl stearate | 2 |
| Di-2-ethylhexyl phthalate | 3 |
| Vinyl chloride-vinyl acetate copolymer | 20 |
| Tetrahydrofuran | 200 |

The thus obtained reversible thermosensitive recording layer was heated to 65° C., so that it was changed into the transparent state.

Using a thermal head, the thermal energy was applied to the recording layer for image formation. As a result, milky white opaque images were formed on the transparent background of the reversible thermosensitive recording layer.

Another polyester film was surface-treated to be rough and aluminum was deposited on the rough surface thereof, so that a light reflection layer having a specular gloss of 223% was prepared. The thus prepared light reflection layer was placed behind the back side of the above transparent polyester film which supported the thermosensitive recording layer. Thus, a reversible thermosensitive recording material No. 5 according to the present invention was obtained. As a result of the formation of the light reflection layer, milky white opaque images were clearly obtained on the aluminum glossy surface.

EXAMPLE 6

Aluminum was deposited on a surface of a polyester film, which polyester film was not surface-treated, so that a light reflection layer having a specular gloss of 291% was prepared.

A mixture of the following components was dispersed and the thus obtained coating solution was coated on the back side (non aluminum-deposited side) of the above polyester film by a wire bar and dried under application of heat, so that a reversible thermosensitive recording layer having a thickness of 15 μm was formed. Thus, a reversible thermosensitive recording material No. 6 according to the present invention was obtained.

| | Parts by Weight |
|---|---|
| Behenic acid | 8 |
| Stearyl stearate | 2 |
| Di-2-ethylhexyl phthalate | 3 |
| Vinyl chloride-vinyl acetate copolymer | 20 |
| Tetrahydrofuran | 200 |

The thus obtained reversible thermosensitive recording material was heated to 65° C., so that the reversible thermosensitive recording layer was changed into the transparent state.

Using a thermal head, the thermal energy was applied to the recording layer for image formation. As a result, milky white opaque images were clearly obtained on the aluminum glossy surface. However, images appeared unclear from some angles due to the regular reflection of the illumination.

EXAMPLE 7

A mixture of the following components was dispersed and the thus obtained coating solution was coated on the surface of a film printed in silver having a specular gloss of 49.5%, serving as the light reflection layer, by a wire bar and dried under application of heat, so that a reversible thermosensitive recording layer having a thickness of 15 μm was formed on the light reflection layer. Thus, a reversible thermosensitive recording material No. 7 according to the present invention was obtained.

| | Parts by Weight |
|---|---|
| Behenic acid | 8 |
| Stearyl stearate | 2 |
| Di-2-ethylhexyl phthalate | 3 |
| Vinyl chloride-vinyl acetate copolymer | 20 |
| Tetrahydrofuran | 200 |

The thus obtained reversible thermosensitive recording material was heated to 65° C., so that the reversible thermosensitive recording layer was changed into the transparent state.

Using a thermal head, the thermal energy was applied to the recording layer for image formation. As a result, milky white opaque images were formed on the silver background of the light reflection layer. However, the image contrast was relatively low.

COMPARATIVE EXAMPLE 3

A mixture of the following components was dispersed and the thus obtained coating solution was coated on one side of a transparent polyester film by a wire bar and dried under application of heat, so that a reversible thermosensitive recording layer having a thickness of 15 μm was formed on the polyester film.

| | Parts by Weight |
|---|---|
| Behenic acid | 8 |
| Stearyl stearate | 2 |
| Di-2-ethylhexyl phthalate | 3 |
| Vinyl chloride-vinyl acetate copolymer | 20 |
| Tetrahydrofuran | 200 |

The thus obtained reversible thermosensitive recording layer was heated to 65° C., so that the reversible thermosensitive recording layer was changed into the transparent state.

Using a thermal head, the thermal energy was applied to the recording layer for image formation. As a result, milky white opaque images were formed on the transparent background.

A black drawing paper, serving as the light reflection layer was placed behind the back side of the above transparent polyester film, whereby a comparative reversible thermosensitive recording material No. 3 was obtained. As a result of the formation of the light reflection layer, milky white opaque images were formed on the black background. However, the image contrast was degraded.

Using the thus obtained reversible thermosensitive recording materials according to the present invention No. 3 to No. 7 and the comparative reversible thermosensitive recording material No. 3, the density of the transparent area and milky white opaque area was measured by Macbeth densitometer RD-514. In addition, image clearness was visually inspected when the illumination was regularly reflected. The results are shown in Table 1.

TABLE 1

| | Glossi | Reflected Density | | | Image |
|---|---|---|---|---|---|
| Example NO. | ness (%) of Light Reflection layer | Image area (white opaque area) | Non-image area (transparent area) | Contrast | Clearness (when illumination is regularly reflected.) |
| 3 | 223 | 0.11 | 0.98 | 8.9 | o |
| 4 | 95.9 | 0.11 | 0.52 | 4.7 | o |
| 5 | 223 | 0.11 | 1.02 | 9.3 | o |
| 6 | 291 | 0.11 | 1.12 | 10.2 | x |
| 7 | 49.5 | 0.25 | 0.54 | 2.2 | o |
| Com. Exa. 3 | — | 0.46 | 1.38 | 3.0 | o |

EXAMPLE 8

A mixture of the following components was dispersed in a ball mill for 24 hours and the thus obtained mixture was coated on a polyester film having a thickness of 188 μm by a wire bar and dried, so that a support having a surface roughness of 1 μm was prepared.

| | Parts by Weight |
|---|---|
| Acryl polyol | 15 |
| Polyisocyanate | 5 |

-continued

| | Parts by Weight |
|---|---|
| Finely-divided particles of silica (average particle diameter of 0.5 to 1 μm) | 5 |
| Methyl ethyl ketone | 75 |

Aluminum was deposited on the surface of the above formed support, so that a light reflection layer having a thickness of 300 Å was prepared.

A mixture of the following components was dispersed and the thus obtained coating solution was coated on the surface of the above formed light reflection layer by a wire bar and dried under application of heat, so that a reversible thermosensitive recording layer having a thickness of 4 μm was formed on the light reflection layer. Thus, a reversible thermosensitive recording material No. 8 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer | 20 |
| Tetrahydrofuran | 150 |

The thus obtained reversible thermosensitive recording material was heated to 65° C., so that the reversible thermosensitive recording layer was changed into the transparent state.

Using a thermal head, the thermal energy was applied to the recording layer for image formation. As a result, milky white opaque images were clearly obtained on the aluminum glossy surface.

EXAMPLE 9

A polyester film having a thickness of 50 μm was dipped in a 5% trichloroacetic acid solution for 5 minutes and washed with water, so that a support having a surface roughness of 3 μm was prepared.

Aluminum was deposited on one side of the above formed support, so that a light reflection layer having a thickness of 300 μm was prepared.

A mixture of the following components was dispersed and the thus obtained coating solution was coated on the other side of the above support by a wire bar and dried under application of heat, so that a reversible thermosensitive recording layer having a thickness of 4 μm was formed on the support. Thus, a reversible thermosensitive recording material No. 9 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer | 20 |
| Tetrahydrofuran | 150 |

The thus obtained reversible thermosensitive recording material was heated to 65° C., so that the reversible thermosensitive recording layer was changed into the transparent state.

Using a thermal head, the thermal energy was applied to the recording layer for image formation. As a result, milky white opaque images were clearly obtained on the aluminum glossy surface.

EXAMPLE 10

A mixture of the following components was dispersed in a ball mill for 24 hours and the thus obtained mixture was coated on a polyester film having a thickness of 188 μm by a wire bar and dried, so that a support having a surface roughness of 7 μm was prepared.

| | Parts by Weight |
|---|---|
| Acryl polyol | 15 |
| Polyisocyanate | 5 |
| Finely-divided particles of silica (average particle diameter of 4 to 5 μm) | 5 |
| Methyl ethyl ketone | 75 |

Aluminum was deposited on the surface of the above formed support, so that a light reflection layer having a thickness of 300 Å was prepared.

A mixture of the following components was dispersed and the thus obtained coating solution was coated on the surface of the above formed light reflection layer by a wire bar and dried under application of heat, so that a reversible thermosensitive recording layer having a thickness of 4 μm was formed on the light reflection layer. Thus, a reversible thermosensitive recording material No. 10 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer | 20 |
| Tetrahydrofuran | 150 |

The thus obtained reversible thermosensitive recording material was heated to 65° C., so that the reversible thermosensitive recording layer was changed into the transparent state.

Using a thermal head, the thermal energy was applied to the recording layer for image formation. As a result, milky white opaque images were clearly obtained on the aluminum glossy surface.

EXAMPLE 11

Aluminum was deposited on the surface of a polyester film having a thickness of 188 μm serving as a support, so that a light reflection layer having a thickness of 300 Å was formed on the support.

A mixture of the following components was dispersed and the thus obtained coating solution was coated on the surface of the above formed light reflection layer by a wire bar and dried under application of heat, so that a reversible thermosensitive recording layer having a thickness of 4 μm was formed on the light reflection layer. Thus, a reversible thermosensitive recording material No. 11 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer | 20 |
| Tetrahydrofuran | 150 |

The thus obtained reversible thermosensitive recording material was heated to 65° C., so that the reversible thermosensitive recording layer was changed into the transparent state.

Using a thermal head, the thermal energy was applied to the recording layer for image formation.

EXAMPLE 12

A mixture of the following components was dispersed in a ball mill for 24 hours and the thus obtained mixture was coated on a polyester film having a thickness of 188 μm by a wire bar and dried, so that a support having a surface roughness of 12 μm was prepared.

| | Parts by Weight |
|---|---|
| Acryl polyol | 15 |
| Polyisocyanate | 5 |
| Finely-divided particles of urea-formaldehyde resin (average particle diameter of 7 to 10 μm) | 5 |
| Methyl ethyl ketone | 75 |

Aluminum was deposited on the surface of the above formed support, so that a light reflection layer having a thickness of 300 Å was prepared.

A mixture of the following components was dispersed and the thus obtained coating solution was coated on the surface of the above formed light reflection layer by a wire bar and dried under application of heat, so that a reversible thermosensitive recording layer having a thickness of 4 μm was formed on the light reflection layer. Thus, a reversible thermosensitive recording material No. 12 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer | 20 |
| Tetrahydrofuran | 150 |

The thus obtained reversible thermosensitive recording material was heated to 65° C., so that the reversible thermosensitive recording layer was changed into the transparent state.

Using a thermal head, the thermal energy was applied to the recording layer for image formation.

COMPARATIVE EXAMPLE 4

A mixture of the following components was dispersed in a ball mill for 24 hours and the thus obtained mixture was coated on a polyester film having a thickness of 188 μm by a wire bar and dried, so that a support having a surface roughness of 1 μm was prepared.

| | Parts by Weight |
|---|---|
| Acryl polyol | 15 |
| Polyisocyanate | 5 |
| Finely divided particles of silica (average particle diameter of 0.5 to 1 μm) | 5 |
| Carbon black | 1 |
| Methyl ethyl ketone | 74 |

A mixture of the following components was dispersed and the thus obtained coating solution was coated on the surface of the above formed support by a wire bar and dried under application of heat, so that a reversible thermosensitive recording layer having a thickness of 4 μm was formed on the support. Thus, a comparative reversible thermosensitive recording material No. 4 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer | 20 |
| Tetrahydrofuran | 150 |

The thus obtained reversible thermosensitive recording material was heated to 65° C., so that the reversible thermosensitive recording layer was changed into the transparent state.

Using a thermal head, the thermal energy was applied to the recording layer for image formation.

Using the thus obtained reversible thermosensitive recording materials according to the present invention No. 8 to No. 12 and the comparative reversible thermosensitive recording material No. 4, the density of the transparent area and milky white opaque area was measured by Macbeth densitometer RD-514. In addition, image clearness was visually inspected when the illumination was regularly reflected. The results are shown in Table 2.

TABLE 2

| Example No. | Surface roughness of roughness (μm) of Light Reflection Layer | Reflected Density: Image area (white opaque area) | Reflected Density: Non-image area (transparent area) | Contrast | Image: Clearness (when illumination is regularly reflected.) |
|---|---|---|---|---|---|
| 8 | 1 | 0.25 | 1.43 | 5.7 | o |
| 9 | 3 | 0.25 | 1.38 | 5.5 | o |
| 10 | 7 | 0.26 | 1.25 | 4.8 | o |
| 11 | — | 0.26 | 1.53 | 5.9 | x |
| 12 | 12 | 0.37 | 0.82 | 2.2 | o |
| Com. Exa.4 | 1 | 1.53 | 1.87 | 1.2 | — |

EXAMPLE 13

A mixture of the following components was dispersed and the thus obtained coating solution was coated on an aluminum surface of an aluminum-deposited polyester film having a thickness of 50 μm, serving as a light reflection layer, by a wire bar and dried under application of heat, so that an adhesive layer having a thickness of 1 μm was formed on the light reflection layer.

| | Parts by Weight |
|---|---|
| Vinyl chloride-vinyl acetate-maleic acid copolymer (Trademark "VMCH" made by Union Carbide Japan K.K.) | 15 |
| Toluene | 40 |
| Methyl ethyl ketone | 45 |

A mixture of the following components was dispersed and the thus obtained coating solution was coated on the above formed adhesive layer by a wire bar and dried under application of heat, so that a reversible thermosensitive recording layer having a thickness of 5 μm was formed on the adhesive layer. Thus, a reversible thermosensitive recording material No. 13 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer (Trademark "VYHH" made by Union Carbide Japan K.K.) | 20 |
| Tetrahydrofuran | 200 |

The thus obtained reversible thermosensitive recording material was heated to 65° C., so that the reversible thermosensitive recording layer was changed into the transparent state.

EXAMPLE 14

A mixture of the following components was dispersed and the thus obtained coating solution was coated on an aluminum surface of an aluminum-deposited polyester film having a thickness of 50 μm, serving as a light reflection layer, by a wire bar and dried under application of heat, so that an adhesive layer having a thickness of 1 μm was formed on the light reflection layer.

| | Parts by Weight |
|---|---|
| Vinyl chloride-vinyl acetate-maleic add copolymer (Trademark "Denka Vinyl #1000CK2" by Denki Kagaku Kogyo K.K.) | 15 |
| Toluene | 40 |
| Methyl ethyl ketone | 45 |

A mixture of the following components was dispersed and the thus obtained coating solution was coated on the above formed adhesive layer by a wire bar and dried under application of heat, so that a reversible thermosensitive recording layer having a thickness of 5 μm was formed on the adhesive layer. Thus, a reversible thermosensitive recording material No. 14 was obtained.

| | Parts by Weight |
|---|---|
| Behenic acid | 9 |
| Stearyl stearate | 2 |
| Di-2-ethylhexyl phthalate | 2 |
| Vinyl chloride-vinyl acetate copolymer (Trademark "VYHH" made by Union Carbide Japan K.K.) | 20 |
| Tetrahydrofuran | 200 |

The thus obtained reversible thermosensitive recording material was heated to 65° C., so that the reversible thermosensitive recording layer was changed into the transparent state.

EXAMPLE 15

A mixture of the following components was dispersed and the thus obtained coating solution was coated on an aluminum surface of an aluminum-deposited polyester film having a thickness of 50 μm, serving as a light reflection layer, by a wire bar and dried under application of heat, so that an adhesive layer having a thickness of 1 μm was formed on the light reflection layer.

| | Parts by Weight |
|---|---|
| Vinyl chloride-vinyl acetate-vinyl alcohol copolymer (Trademark "VAGH" made by Union Carbide in K.K.) | 15 |
| Isocyanate (a 50% toluene solution) (Trademark "Coronate L" made by Nippon Polyurethane Industry Co., Ltd) | 3 |
| Toluene | 47 |
| Methyl ethyl ketone | 35 |

A mixture of the following components was dispersed and the thus obtained coating solution was coated on the above formed adhesive layer by a wire bar and dried under application of heat, so that a reversible thermosensitive recording layer having a thickness of 5 μm was formed on the adhesive layer. Thus, a reversible thermosensitive recording material No. 15 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer (Trademark "VYHH" made by Union Carbide Japan K.K.) | 20 |
| Tetrahydrofuran | 200 |

The thus obtained reversible thermosensitive recording material was heated to 65° C., so that the reversible thermosensitive recording layer was changed into the transparent state.

EXAMPLE 16

A mixture of the following components was dispersed and the thus obtained coating solution was coated on an aluminum surface of an aluminum-deposited polyester film having a thickness of 50 μm, serving as a light reflection layer, by a wire bar and dried under application of heat, so that an adhesive layer having a thickness of 1 μm was formed on the light reflection layer.

| | Parts by Weight |
|---|---|
| Saturated polyester resin (Trademark "Vylon 280" made by Toyobo Co., Ltd.) | 15 |
| Isocyanate (a 50% toluene solution) (Trademark "Coronate L" made by Nippon Polyurethane Industry Co., Ltd.) | 3 |
| Toluene | 47 |
| Methyl ethyl ketone | 35 |

A mixture of the following components was dispersed and the thus obtained coating solution was coated on the above formed adhesive layer by a wire bar and dried under application of heat so that a reversible thermosensitive recording layer having a thickness of 5 μm was formed on the adhesive layer. Thus, a reversible thermosensitive recording material No. 16 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer (Trademark "VYHH" by Union Carbide Japan K.K.) | 20 |
| Tetrahydrfuran | 200 |

The thus obtained reversible thermosensitive recording material was heated to 65° C., so that the reversible thermosensitive recording layer was changed into the transparent state.

EXAMPLE 17

A mixture of the following components was dispersed and the thus obtained coating solution was coated on an aluminum surface of an aluminum-deposited polyester film having a thickness of 50 μm, serving as a light reflection layer, by a wire bar and dried under application of heat, so that an adhesive layer having a thickness of 1 μm was formed on the light reflection layer.

| | Parts by Weight |
|---|---|
| Vinyl chloride-vinyl acetate-phosphoric ester copolymer (at mixing ratio by weight of 85:14:1) (Phosphoric acid ester = Acid phosphoxy ethyl methacrylate) | 15 |
| Toluene | 40 |
| Methyl ethyl ketone | 45 |

A mixture of the following components was dispersed and the thus obtained coating solution was coated on the above formed adhesive layer by a wire bar and dried under application of heat, so that a reversible thermosensitive recording layer having a thickness of 5 μm was formed on the adhesive layer. Thus, a reversible thermosensitive recording material No. 17 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer (Trademark "VYHH" made by Union Carbide Japan K.K.) | 20 |
| Tetrahydrofuran | 200 |

The thus obtained reversible thermosensitive recording material was heated to 65° C., so that the reversible thermosensitive recording layer was changed into the transparent state.

EXAMPLE 18

An aluminum foil was attached to a polyester film to prepare a light reflection layer having a thickness of 10 μm.

A mixture of the following components was dispersed and the thus obtained coating solution was coated on an aluminum foil side of the above formed light reflection layer by a wire bar and dried under application of heat, so that an adhesive layer having a thickness of 1 μm was formed on the light reflection layer.

| | Parts by Weight |
|---|---|
| Vinyl chloride-vinyl acetate-vinyl alcohol-phosphoric ester copolymer (at mising ratio by weight of 91:2:6:1) (Phosphoric ester = Acid phosphoxy propyl methacrylate) | 15 |
| Toluene | 40 |
| Methyl ethyl ketone | 45 |

A mixture of the following components was dispersed and the thus obtained coating solution was coated on the above formed adhesive layer by a wire bar and dried under application of heat, so that a reversible thermosensitive recording layer having a thickness of 5 μm was formed on the adhesive layer. Thus, a reversible thermosensitive recording material No. 18 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer (Trademark "VYHH" made by Union Carbide Japan K.K.) | 20 |
| Tetrahydrofuran | 200 |

The thus obtained reversible thermosensitive recording material was heated to 65° C., so that the reversible thermosensitive recording layer was changed into the transparent state.

EXAMPLE 19

A mixture of the following components was dispersed and the thus obtained coating solution was coated on an aluminum surface of an aluminum-deposited polyester film having a thickness of 50 μm, serving as a light reflection layer, by a wire bar and dried under application of heat, so that an adhesive layer having a thickness of 1 μm was formed on the light reflection layer.

| | Parts by Weight |
|---|---|
| Vinyl chloride-vinylidene chloride-phosphoric ester copolymer (at mixing ration by weight of 82:15:3) (Phosphoric ester = 3-chloro-2-acid phosphoxy propyl methacrylate) | 15 |
| Toluene | 47 |
| Methyl ethyl ketone | 35 |

A mixture of the following components was dispersed and the thus obtained coating solution was coated on the above formed adhesive layer by a wire bar and dried under application of heat, so that a reversible thermosensitive recording layer having a thickness of 5 μm was formed on the adhesive layer. Thus, a reversible thermosensitive recording material No. 19 was obtained.

| | Parts by Weight |
|---|---|
| Behenic acid | 8 |
| Stearyl stearate | 2 |
| Di-2-ethylhexyl phthalate | 2 |
| Vinyl chloride-vinyl acetate copolymer (Trademark "VYHH" made by Union Carbide Japan K.K.) | 20 |
| Tetrahydrofuran | 200 |

The thus obtained reversible thermosensitive recording material was heated to 65° C., so that the reversible thermosensitive recording layer was changed into the transparent state.

EXAMPLE 20

Example 13 was repeated except that the adhesive layer having a thickness of 1 μm was not formed between the light reflection layer and the reversible thermosensitive recording layer, whereby a reversible thermosensitive recording material No. 20 was obtained.

The thus obtained reversible thermosensitive recording material was heated to 65° C., so that the reversible thermosensitive recording layer was changed into the transparent state.

COMPARATIVE EXAMPLE 5

Example 13 was repeated except that the aluminum-deposited polyester film having a thickness of 50 μm, serving as a light reflection layer employed in Example 13, was replaced by a black polyester film having a thickness of 100 μm in which carbon black was kneaded, whereby a comparative reversible thermosensitive recording material No. 5 was obtained.

The thus obtained comparative reversible thermosensitive recording material was heated to 65° C., so that the reversible thermosensitive recording layer was changed into the transparent state.

Using a commercially available multi-cross cutter (Trademark "Model 295" made by Erichsen), each reversible thermosensitive recording layer of the above obtained reversible thermosensitive recording materials No. 13 to No. 20 and the comparative reversible thermosensitive recording material No. 5 was crosscut into 25 partitions.

The thus obtained reversible thermosensitive recording materials were subjected to a peel-off test (cross-cut test) using an adhesive tape to evaluate the adhesion properties of each recording material. The results are shown in Table 3.

In addition, the thermal energy was applied to the recording layer of each reversible thermosensitive recording materials for image formation using a thermal head, so that milky white opaque images were formed on the transparent recording layer. A black paper was individually placed behind the recording material and the density of the transparent area and milky white opaque area was measured by Macbeth densitometer RD-514. The results are also shown in Table 3.

TABLE 3

| Example No. | Adhesion Properties (*) | Image Density (white opaque image area) | Background Density (transparent non-image area) | Contrast (Background density/ Image density) |
|---|---|---|---|---|
| 13 | ° | 0.28 | 1.56 | 5.6 |
| 14 | ° | 0.25 | 1.55 | 6.2 |
| 15 | ° | 0.24 | 1.53 | 6.4 |
| 16 | ° | 0.29 | 1.58 | 5.4 |
| 17 | ° | 0.36 | 1.63 | 4.5 |
| 18 | ° | 0.30 | 1.48 | 4.9 |
| 19 | ° | 0.32 | 1.46 | 4.6 |
| 20 | x | 0.26 | 1.57 | 6.0 |
| Com. Ex. 5 | ° | 1.41 | 1.87 | 1.3 |

(*) °: The reversible thermosensitive recording layer was not peeled off at all.
x: The reversible thermosensitive recording layer was entirely peeled off.

As previously mentioned, the reversible thermosensitive recording material according to the present invention comprises a light reflection layer made of a metal thin-film and a reversible thermosensitive recording layer which comprises a matrix resin and an organic low-molecular-weight material, so that it can yield images with remarkably high contrast. Further, when the above-mentioned light reflection layer is surface-treated to have a desired specular gloss or surface roughness, the problem of the recognition of obtained images being easily disturbed by the regular reflection of illumination can be solved.

In addition, when an adhesive layer is provided between the reversible thermosensitive recording layer and the light reflection layer, the reversible thermosensitive recording layer is not peeled off the light reflection layer, and accordingly the durability of the recording material is improved.

What is claimed is:

1. A reversible thermosensitive recording material comprising (i) a reversible thermosensitive recording layer which comprises a matrix resin and an organic low-molecular-weight material which is dispersed in said resin, (ii) a light reflection layer made of a metal thin film, and (iii) a transparent support interposed between said thermosensitive recording layer and said light reflection layer.

2. The reversible thermosensitive recording material as claimed in claim 1, further comprising an adhesive layer which is interposed between said transparent support and said light reflection layer, and a second transparent support formed on said light reflection layer on a side opposite to said adhesive layer.

3. The reversible thermosensitive recording material as claimed in claim 1, further comprising a second transparent support on said light reflection layer on a side opposite to said reversible thermosensitive recording layer.

4. The reversible thermosensitive recording material as claimed in claim 1, further comprising a light absorption layer which is interposed between said reversible thermosensitive recording layer and said light reflection layer.

5. The reversible thermosensitive recording material as claimed in claim 1, further comprising a transparent support for supporting said reversible thermosensitive recording layer thereon, and a light reflection layer support member for protecting said light reflection layer, with said reversible thermosensitive recording layer being disposed so as to be superimposed on said light reflection layer through said support.

6. The reversible thermosensitive recording material as claimed in claim 1, wherein said metal thin film has a specular gloss of 70 to 250% in accordance with JIS Z8741 or a surface roughness of 0.5 to 10 μm in terms of a ten-point average roughness as defined in JIS B0601.

7. The reversible thermosensitive recording material as claimed in claim 1, wherein said organic low-molecular-weight material has a melting point ranging from 30° C. to 200° C.

8. The reversible thermosensitive recording material as claimed in claim 1 wherein said organic low-molecular-weight material is a compound containing at least one group or a moiety selected from the group consisting of —OH, —COOH, —COOR (wherein R is $NH_4$ or an alkyl group having 1 to 20 carbon atoms), —$CONH_2$, —NH—, —$NH_2$, —S—, —S—S—, —O—, and a halogen.

9. The reversible thermosensitive recording material as claimed in claim 1, wherein said organic low-molecular-weight material is a higher fatty acid selected from the group consisting of lauric acid, dodecanoic acid, myristic acid, pentadecanoic acid, palmitic acid, stearic acid, behenic acid, nonadecanoic acid, arachic acid and oleic acid.

10. The reversible thermosensitive recording material as claimed in claim 1, wherein said organic low-molecular-weight material is an ester of a higher fatty acid selected from the group consisting of methyl stearate, tetradecyl stearate, octadecyl stearate, octadecyl laurate, tetradecyl palmitate, and dodecyl behenate.

11. The reversible thermosensitive recording material as claimed in claim 1, wherein said organic low-molecular-weight material is an ether selected from the group consisting of:

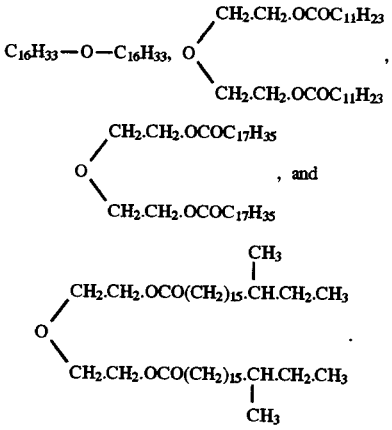

12. The reversible thermosensitive recording material as claimed in claim 1, wherein said organic low-molecular-weight material is a thioether selected from the group consisting of

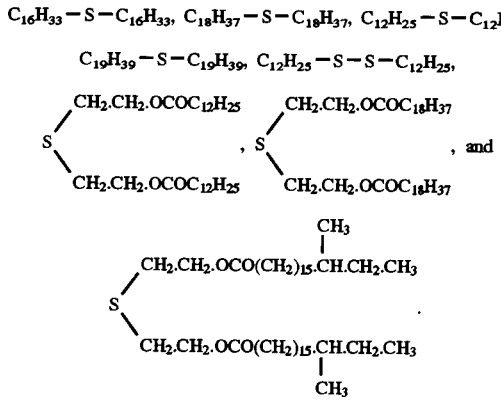

13. The reversible thermosensitive recording material as claimed in claim 1, wherein said organic low-molecular-weight material is a compound selected from the group consisting of:

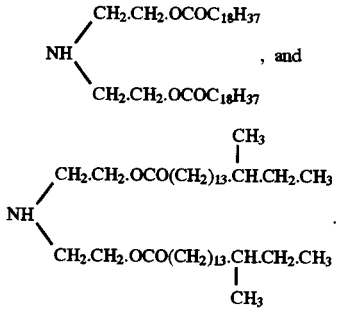

14. The reversible thermosensitive recording material as claimed in claim 1, wherein said organic low-molecular-weight material is a compound selected from the group consisting of an alkanol; an alkane diol; a halogenated alkanol; a halogenated alkane diol; an alkylamine; an alkane; an alkene; an alkyne; a halogenated alkane; a halogenated alkene; a halogenated alkyne; a cycloalkane; a cycloalkene; a cycloalkyne; a saturated or unsaturated monocarboxylic acid, a saturated or unsaturated dicarboxylic acid, esters, amides and ammonium salts thereof; a saturated or unsaturated halogenated fatty acid, esters, amides and ammonium salts thereof; an arylcarboxylic acid, esters, amides and ammonium salts thereof; a halogenated arylcarboxylic acid, esters, amides and ammonium salts thereof; a thioalcohol; a thiocarboxylic acid, esters, amides and ammonium salts thereof; and a carboxylic acid ester of thioalcohol, each said compounds having 10 to 60 carbon atoms.

15. The reversible thermosensitive recording material as claimed in claim 1, wherein said matrix resin is a vinyl chloride copolymer.

16. The reversible thermosensitive recording material as claimed in claim 15, wherein said vinyl chloride copolymer is selected from the group consisting of polyvinyl chloride, vinyl chloride - vinyl acetate copolymer, vinyl chloride - vinyl acetate - vinyl alcohol copolymer, vinyl chloride - vinyl acetate - maleic acid copolymer and vinyl chloride - acrylate copolymer.

17. The reversible thermosensitive recording material as claimed in claim 1, wherein said matrix resin is a vinylidene chloride copolymer.

18. The reversible thermosensitive recording material as claimed in claim 17, wherein said vinylidene chloride copolymer is selected from the group consisting of polyvinylidene chloride, vinylidene chloride - vinyl chloride copolymer and vinylidene chloride - acrylonitrile copolymer.

19. The reversible thermosensitive recording material as claimed in claim 1, wherein said matrix resin is selected from the group consisting of polyester, polyamide, polyacrylate, polymethacrylate, acrylate - methacrylate copolymer, and silicone resin.

20. The reversible thermosensitive recording material as claimed in claim 1, wherein the ratio by weight of the amount of said organic low-molecular-weight material to the amount of the matrix resin is in the range of about 1:0.5 to 1:16.

21. The reversible thermosensitive recording material as claimed in claim 1 wherein said reversible thermosensitive recording layer has a thickness of 1 to 30 μm.

22. The reversible thermosensitive recording material as claimed in claim 1, wherein said reversible thermosensitive recording layer further comprises a crystal-growth controlling agent which can control the crystal growth of said organic low-molecular-weight material.

23. The reversible thermosensitive recording material as claimed in claim 22, wherein said crystal-growth controlling agent is selected from the group consisting of polyhydric alcohol higher fatty acid esters; polyhydric alcohol higher alkyl ethers; sub-olefin oxide addition products of polyhydric alcohol higher fatty acid ester, higher alcohol, higher alkylphenol, higher alkylamine of higher fatty acid, amides of higher fatty acid, fat and oil of higher fatty acid and polypropylene glycol; acetylene glycol; sodium, calcium, barium and magnesium salts of higher alkyl benzenesulfonic acid; sodium, calcium, barium and magnesium salts of higher fatty acid, aromatic carboxylic acid, higher aliphatic sulfonic acid, aromatic sulfonic acid, sulfuric monoester, phosphoric monoester and phosphoric diester lower sulfated oil; long-chain polyalkyl acrylate; acrylic oligomer; long-chain polyalkyl methacrylate; long-chain alkyl methacrylate - amine-containing monomer copolymer; styrene - maleic anhydride copolymer; and olefin - maleic anhydride copolymer.

24. The reversible thermosensitive recording material as claimed in claim 22, wherein said crystal-growth controlling agent is selected from the group consisting of tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol, di-2-ethylbutyrate, methyl acetylricinoleate, butyl acetylricinoleate, butylphthalyl butyl glycolate and tributyl acetylcitrate.

25. The reversible thermosensitive recording material as claimed in claim 22, wherein the ratio by weight of the amount of said organic low-molecular-weight material to the amount of said crystal-growth controlling agent is in the range of 1:0.01 to 1:0.8.

26. The reversible thermosensitive recording material as claimed in claim 1, wherein said metal thin film is made of a metal selected from the group consisting of Al, Ge, Au, Ag, Cu and Ti, and alloys thereof.

27. The reversible thermosensitive recording material as claimed in claim 1, further comprising a second transparent support for supporting said light reflection layer and an adhesive layer, wherein said adhesive layer is interposed between said light reflection layer and said second transparent support.

28. The reversible thermosensitive recording material as claimed in claim 27, wherein said adhesive layer comprises a resin selected from the group consisting of saturated polyester resin, vinyl chloride - vinyl acetate - maleic acid copolymer, and vinyl chloride - vinyl acetate - vinyl alcohol copolymer.

29. The reversible thermosensitive recording material as claimed in claim 2, 3 or 27, wherein said second transparent support is a polyester film.

30. The reversible thermosensitive recording material as claimed in claim 1, wherein said metal thin film has a specular gloss of 70 to 250% in accordance with the following formula:

$$\text{Specular gloss (\%)} = \frac{\text{Luminous flux of specular reflection by a light reflection layer}}{\text{Luminous flux of specular reflection by a standard surface}} \times \text{Specular gloss of standard surface}$$

or a surface roughness of 0.5 to 10 μm in terms of a ten-point average roughness.

*31. A reversible thermosensitive recording material comprising (i) a reversible thermosensitive recording layer which comprises a matrix resin and a low-molecular weight organic material dispersed therein, (ii) a support, and (iii) a light reflection layer made of a thin metal film, interposed between the thermosensitive recording layer and the support.*

*32. The reversible thermosensitive recording material as claimed in claim 31 further comprising an adhesive layer interposed between said support and said light reflection layer.*

*33. The reversible thermosensitive recording material as claimed in claim 32, wherein said adhesive layer comprises a resin selected from the group consisting of saturated polyester resins, vinyl chloride - vinyl acetate - maleic acid copolymers, and vinyl chloride - vinyl acetate - vinyl alcohol copolymers.*

*34. The reversible thermosensitive recording material as claimed in claim 31, further comprising an adhesive layer interposed between said reversible thermosensitive recording layer and said light reflection layer.*

*35. The reversible thermosensitive recording material as claimed in claim 34, wherein said adhesive layer comprises a resin selected from the group consisting of saturated polyester resins, vinyl chloride - vinyl acetate - maleic acid copolymers, and vinyl chloride - vinyl acetate - vinyl alcohol copolymers.*

*36. The reversible thermosensitive recording material as claimed in claim 31, further comprising a light absorption layer interposed between said reversible thermosensitive recording layer and said light reflection layer.*

*37. The reversible thermosensitive recording material of claim 31, further comprising a transparent support for supporting said reversible thermosensitive recording layer thereon, wherein said reversible thermosensitive recording layer is disposed so as to be superimposed on said light reflection layer through said transparent support.*

*38. The reversible thermosensitive recording material as claimed in claim 31, wherein said metal thin film has a specular gloss of 70–250% in accordance with JIS Z8741 or a surface roughness of 0.5–10 μm in terms of a 10-point average roughness as defined in JIS B0601.*

*39. The reversible thermosensitive recording material as claimed in claim 31, wherein said organic low-molecular weight material has a melting point ranging from 30° C. to 200° C.*

*40. The reversible thermosensitive recording material as claimed in claim 31, wherein said organic low-molecular-weight material is:*

*a higher fatty acid selected from the group consisting of lauric acid, dodecanoic acid, myristic acid, pentadecanoic acid, palmitic acid, stearic acid, behenic acid, nonadecanoic acid, arachic acid, and oleic acid;*

*an ester of a higher fatty acid selected from the group consisting of methyl stearate, tetradecyl stearate, octadecyl stearate, octadecyl laurate, tetradecyl palmitate, and dodecyl behenate;*

*an ester selected from the group consisting of*

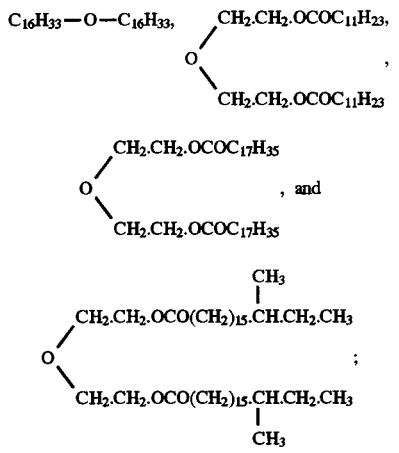

*a thioether selected from the group consisting of*

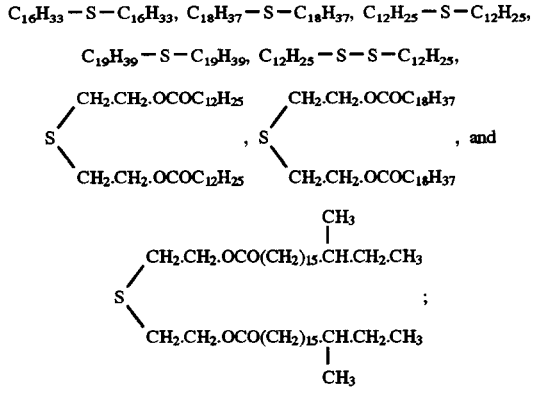

*an amine selected from the group consisting of*

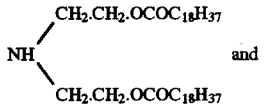

-continued

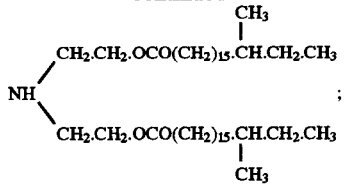

*a compound selected from the group consisting of an alkanol; an alkane diol; a halogenated alkanol; a halogenated alkane diol; an alkylamine; an alkane; an alkene; an alkyne; a halogenated alkane; a halogenated alkene; a halogenated alkyne; a cycloalkane; a cycloalkene; a cycloalkyne; a saturated or unsaturated monocarboxylic acid, a saturated or unsaturated dicarboxylic acid, esters, amides and ammonium salts of said saturated or unsaturated monocarboxylic and dicarboxylic acids; a saturated or unsaturated halogenated fatty acid, esters, amides, and ammonium salts of said saturated or unsaturated halogenated fatty acid; an arylcarboxylic acid, esters, amides and ammonium salts of said arylcarboxylic acid; a halogenated arylcarboxylic acid, esters, amides and ammonium salts of said halogenated arylcarboxylic acid; a thioalcohol; a thiocarboxylic acid, esters, amides and ammonium salts of said thiocarboxylic acid; and a carboxylic acid ester of a thioalcohol, each of said compounds having 10 to 60 carbon atoms.*

*41. The reversible thermosensitive recording material as claimed in claim 31, wherein said matrix resin is selected from the group consisting of a vinyl chloride copolymer, a vinylidene chloride copolymer, a polyester, a polyamide, a polyacrylate, a polymethacrylate, an acrylate-methacrylate copolymer, and a silicone resin.*

*42. The reversible thermosensitive recording material as claimed in claim 41, wherein said matrix resin is a vinyl chloride copolymer or a vinylidene chloride copolymer, said vinyl chloride copolymer being selected from the group consisting of polyvinyl chloride, a vinyl chloride - vinyl acetate copolymer, a vinyl chloride - vinyl acetate - vinyl alcohol copolymer, a vinyl chloride - vinyl acetate - maleic acid copolymer and a vinyl chloride - acrylate copolymer, and said vinylidene chloride copolymer being selected from the group consisting of polyvinylidene chloride, a vinylidene chloride - vinyl chloride copolymer and a vinylidene chloride - acrylonitrile copolymer.*

*43. The reversible thermosensitive recording material as claimed in claim 31, wherein the ratio by weight of the amount of said organic low-molecular-weight material to the amount of the matrix resin is in the range of about 1:0.5 to 1:16.*

*44. The reversible thermosensitive recording material as claimed in claim 31, wherein said reversible thermosensitive recording layer has a thickness of 1 to 30 μm.*

*45. The reversible thermosensitive recording material as claimed in claim 31, wherein said reversible thermosensitive recording layer further comprises a crystal-growth controlling agent which can control the crystal growth of said organic low-molecular-weight material.*

*46. The reversible thermosensitive recording material as claimed in claim 45, wherein said crystal-growth controlling agent is selected from the group consisting of polyhydric alcohol higher fatty acid esters; polyhydric alcohol higher alkyl ethers; sub-olefin oxide addition products of polyhydric alcohol higher fatty acid esters, higher alcohols, higher alkylphenols, higher alkylamines of higher fatty acids,*

*amides of higher fatty acids, fats and oils of higher fatty acids and polypropylene glycol; acetylene glycol; sodium, calcium, barium and magnesium salts of higher alkyl benzenesulfonic acids; sodium, calcium, barium and magnesium salts of higher fatty acids, aromatic carboxylic acids, higher aliphatic sulfonic acids, aromatic sulfonic acids, sulfuric acid monoesters, phosphoric acid monoesters and phosphoric acid diesters; lower sulfated oils; long-chain polyalkyl acrylates; acrylic oligomers; long-chain polyalkyl methacrylates; long-chain alkyl methacrylate-amine-containing monomer copolymers; styrene-maleic anhydride copolymers; and olefin - maleic anhydride copolymers.*

*47. The reversible thermosensitive recording material as claimed in claim 45, wherein said crystal-growth controlling agent is selected from the group consisting of tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol, di-2-ethylbutyrate, methyl acetylricinoleate, butyl acetylricinoleate, butylphthalyl butyl glycolate and tributyl acetylcitrate.*

*48. The reversible thermosensitive recording material as claimed in claim 45, wherein the ratio by weight of the amount of said organic low-molecular-weight material to the amount of said crystal-growth controlling agent is in the range of 1:0.01 to 1:0.8.*

*49. The reversible thermosensitive recording material as claimed in claim 31, wherein said thin metal film is selected from the group consisting of Al, Ge, Au, Ag, Cu, Ti, and alloys thereof.*

* * * * *

UNITED STATES PATENT AND TRADEMARK OFFICE

CERTIFICATE OF CORRECTION

PATENT NO. : Re. 35,640
DATED : OCTOBER 21, 1997
INVENTOR(S) : YOSHIHIKO HOTTA ET AL

It is certified that error appears in the above-identified patent and that said Letters Patent is hereby corrected as shown below:

In the Abstract, second to the last line, "comprises" should read --comprise--.

Column 4, line 49, "copolymer;," should read --copolymer;--.

Column 9, line 67, "layer a" should read --layer 1--.

Column 10, line 4, "leading" should read --loading--.

Column 18, Table 1, second column, "95.9" should read --85.9--.

Column 24, line 4, "9" should read --8--.

Column 26, line 35, "mising" should read --mixing--.

Column 27, line 12, "ration" should read --ratio--.

Signed and Sealed this

Seventh Day of July, 1998

Bruce Lehman

*Attest:*

BRUCE LEHMAN

*Attesting Officer*

*Commissioner of Patents and Trademarks*